Patented Nov. 20, 1934

1,981,691

UNITED STATES PATENT OFFICE 1,981,691

RUBBER MANUFACTURE

Adam Joan Adriaan Yssel de Schepper,
The Hague, Netherlands

No Drawing. Application July 15, 1932, Serial No. 622,819. In Great Britain August 21, 1931

18 Claims. (Cl. 18—50)

The invention relates to a method for making and obtaining rubber in powdered form, from dispersions such as latex, or from solutions. By rubber in powdered form a product is meant, consisting of small particles, such as very little balls or slices and threads or fibres.

It is already known to dry latex by atomizing, by which method a spongy mass is obtained, which is pressed into blocks.

Also it has been proposed to receive the atomized latex on a moving belt, and making sheets thereof by pressure.

These inventions refer to atomizing latex into clouds and hazes, which after falling down stick together.

Furthermore it is known to obtain sheets on rotating drums, by drying latex films on the inner or outer surface of the drum.

The present invention, however, gives a product which is not obtainable by the above mentioned inventions, this product being rubber in powdered form. It is obtained by treating, as hereinafter described, unpreserved or preserved, unstabilized or stabilized, diluted or concentrated, natural or redispersed, unvulcanized or vulcanized latex, whether pretreated or not, or by treating unvulcanized or vulcanized rubber solutions. All sorts of raw materials can be treated, not only from Hevea brasiliensis, but also from all rubber or the like yielding trees.

The mentioned pretreating of the dispersion or of the solution, may consist of any known method of treating the raw materials or of influencing the properties of the liquid or the products therefrom obtained. For instance latex may be freed from protein by centrifuging, or substances may be added to the latex to give the product more plasticity. Another pretreatment consists of prewarming the liquid or adding volatile substances to it, to the aim of which will be referred later on.

The production of some special kinds of rubber powder has been found possible by spray-drying. However, according to this method of drying it is inevitable that the dried particles are deposited as a layer on the collecting area. As already above stated in respect of spray-drying latex, this generally means that the rubber particles stick together. To prevent this it has been proposed to vulcanize the outer shell of the particles before their accumulation, to wit by a gaseous vulcanizing agent, reacting with the particles while in suspension. Furthermore it has been found possible to prevent cohering by coating the particles with hemoglobine, by which method also coagulation is prevented so that a redispersible powder is obtained. Finally it has been proposed to vulcanize rubber dispersions to their saturation point, so that by spray-drying a hard rubber dust may be obtained, which does not tend to amass.

The present invention, however, provides a general method to produce rubber powder from dispersions or from solutions. This by preventing any mutual contact between the particles up to and including their removal. According to the present invention, the liquid is deposited in the form of non-cohering drops on a drying surface, on which drying occurs, so that discrete dried rubber particles can be removed from same.

To obtain the drops known dropping apparatus may be used, such as dropping pins or capillary or medical dropping apparatus.

Also a spraying apparatus may be used, by the use of which under moderate pressures relatively coarse drops may be formed. In this case the formation of a film on the drying surface may be prevented by applying a sufficient relative speed between supplying apparatus and drying surface. The spraying may be carried out with interruptions, so as to prevent the formation of a film.

The best results, however, are obtained by the use of a supplying apparatus producing one or more jets, which under low hydraulic pressures, fall to drops succeeding each other. This means that the drops remain in a single line on which they follow each other at a certain distance. For instance, by using a nozzle which under a pressure of 0.10 kg/cm$^2$ has a water capacity of 25 cm$^3$ per minute, a jet of preserved latex under a pressure of 0.075 kg/cm$^2$ falls to drops succeeding each other at about 6 cm from the nozzle.

By applying a relative movement between supplying apparatus and drying surface, things now can be arranged easily in such a way that the drops are received by this surface apart from but close to each other. In the example mentioned under circumstances this speed may be fixed at 1 metre per second.

Concentration of the drops by evaporation may be effected during their travel to the drying surface, for instance by means of hot air or other gases or superheated vapours, such as combustion gases, or by a more or less complete vacuum.

The concentration of the drops and the drying of the rubber particles on the drying surface may be carried out in different ways. For instance by heating the drying surface by hot water, steam, hot air or other gases, such as combustion gases, which heating may be direct or indirect. Also by passing a stream of a drying medium e. g. warm or hot air or other gases or superheated vapours, such as combustion gases, along the side of the drying surface on which the drops adhere, or by application of a more or less complete vacuum at this side; also by arranging a source of heat opposite this side of the drying surface. It is obvious that these means may also be applied in combination with each other.

The drying capacity of the drying surface may be increased by preheating the liquid to be treated or by adding volatile matter to it by which evaporation of the liquid may be stimulated.

The drying on the drying surface may also be promoted by flattening rollers or other means for flattening the particles on this surface. Calendering may be applied before removing the rubber particles to increase the density of the product.

In choosing temperatures it is necessary to take into consideration the desired properties of the product. In making for instance a normal raw "whole latex" product, the temperature of the rubber itself must be kept below such a level which might be considered detrimental to the rubber, which temperature varies according to the history of the rubber. In any case it is necessary to take care that when removing the rubber particles from the drying surface, their temperature must be kept on or decreased to such a level, at which the rubber is not too sticky.

During its presence on the drying surface, any known chemical action may be exercised on the rubber. This can even be done by only superheating the rubber, which gives the product more plasticity. It is possible to vulcanize the rubber on the drying surface, if vulcanizing agents should have been compounded to the treated liquid, or are present in the stream passing along the drying surface. During this vulcanization pressure may be exerted by rollers. Other examples are creosote for exerting a preserving influence, oxygen for giving the product more plasticity, and any known agents to promote coagulation.

For removing the rubber particles from the drying surface, scraping, brushing or rubbing-off apparatus may be used. For instance rollers can be used, by preference coated with a somewhat elastic material, which may be water-cooled. Also scraping knives may be used, and in case of a convex drying surface strained strings can be applied. In case the rubber particles adhere too much to the drying surface, the latter or the removing apparatus or both may be moistened to make the removing more easy. The manner in which they are removed is responsible for the different forms of the removed rubber particles, however, always giving a rubber powder.

Before the rubber particles are removed from the drying surface, same or the removing apparatus or both may be dusted with talc or other suitable pulverized materials. It also may be advisable to dust the rubber particles after they have been removed. In some cases an after-treatment comprising continued drying or cooling may be applied. The product may be treated in any known way for giving it desired properties or applying it for special uses.

The drying surface may comprise a rotatable drum, the catching of the drops and the removing of the rubber particles being done simultaneously over the whole length of the drum without interspaces. In this case the drying must be completed within one revolution of the drum, or supplying as well as removing have to be done intermittently. By giving the supplying apparatus a movement contrary to the peripheral speed of the drum, extension of the drying period can be achieved, while the drops are supplied intermittently and the rubber particles are removed continuously.

Other means for extending the drying period between catching a drop and removing the rubber particle may consist of a moving supplying apparatus, the drops forming single or plural helical lines on the drying surface. In this case the intended extension can be reached by a sufficiently reduced revolving speed, together with an increased axial speed of the supplying apparatus, when removal of the rubber particles can be done simultaneously over the whole length of the drum without interspaces. This extension can also be achieved by only slightly or not at all reducing the revolving speed, the drum making more than one revolution between catching a drop and removing the rubber particle, when this removing has to be done by axially moving or only local acting removing apparatus. On the contrary, it is obvious that the supplying apparatus may be stationary, the drum itself moving axially.

The drops may be received on the outer surface of the drum. In this case the removed rubber particles may be caught up by sloping smooth surfaces along which they may fall down, for instance on to an endless belt for conveyance to their further destination.

The drops may also be received on the inner surface of the drum, which may be double-jacketed. Provided that the drying is completed within one revolution of the drum, the removed rubber particles can be conveyed along the inner side of the drum by giving the latter a sloping position.

The drying surface may also comprise an endless belt, or consist of transported or conveyed parts or of rotatable discs.

It is obvious that instead of a moving drying surface same may be stationary, the relative movement being achieved by moving apparatus for supplying with drops and removing the rubber particles.

The drying surface should be of smooth and dense material, not liable to corrosion, such as stainless steel. In the case of an endless belt, for instance vulcanized rubber, glazed fabrics or steel can be used.

By the method described, raw rubber can be produced in powdered form, which can be mixed more easily than ordinary rubber with compounding materials, such as active or inactive fillers, vulcanizing agents, accelerators and dyes. This mixing is not even necessary if these materials should have been compounded to the treated liquid, resulting in a compounded rubber powder, which may be vulcanizable. By vulcanizing on the drying surface or by treating vulcanized rubber containing liquids, for instance vulcanized latex, an already vulcanized rubber powder may be produced. This vulcanizing may be finished or only partly finished.

It is obvious that these rubber powders, on account of their form and properties, will suit as well both the hot and the cold curing rubber industries, as mixing, mastication and solution are facilitated. These powders will furthermore be suitable for different special purposes, as well in as out of the present day rubber industry.

I claim:—

1. A method for making and obtaining rubber in powdered form, from dispersions or solutions, comprising dividing the liquid in the form of non-cohering drops, catching the drops apart from each other on a drying surface by applying a relative movement between the supplying apparatus and the drying surface, and removing the dried non-cohering rubber particles.

2. A method as claimed in claim 1, comprising producing a jet of liquid rubber which under low hydraulic pressures falls to drops succeeding each other, and receiving these drops apart from but close to each other on the drying surface.

3. A method as claimed in claim 1, comprising producing jets of liquid rubber which under low hydraulic pressures fall to drops succeeding each other, and receiving these drops apart from but close to each other on the drying surface.

4. A method as claimed in claim 1, the necessary relative movement between the supplying apparatus and the drying surface being obtained solely by the movement of the latter.

5. A method as claimed in claim 1, the necessary relative movement between the supplying apparatus and the drying surface being obtained partly by movement of the supplying apparatus and partly by movement of the drying surface.

6. A method as claimed in claim 1, the necessary relative movement between the supplying apparatus and the drying surface being obtained solely by the movement of the former.

7. A method as claimed in claim 1, comprising concentrating the drops by evaporation during their travel to the drying surface.

8. A method as claimed in claim 1, comprising concentrating the drops and drying the rubber particles by heat applied to the drying surface.

9. A method as claimed in claim 1, comprising concentrating the drops and drying the rubber particles by passing a stream of a drying medium along the side of the drying surface on which the drops adhere.

10. A method as claimed in claim 1, comprising concentrating the drops and drying the rubber particles by applying a reduced pressure along the side of the drying surface on which the drops adhere.

11. A method as claimed in claim 1, comprising concentrating the drops and drying the rubber particles by arranging a source of heat opposite the side of the drying surface on which the drops adhere.

12. A method as claimed in claim 1, comprising flattening the particles on the drying surface by pressure.

13. A method as claimed in claim 1, comprising flattening the particles on the drying surface by flattening rollers.

14. A method as claimed in claim 1, comprising removing the rubber particles from the drying surface by scraping apparatus.

15. A method as claimed in claim 1, comprising removing the rubber particles from the drying surface by brushing apparatus.

16. A method as claimed in claim 1, comprising removing the rubber particles from the drying surface by rubbing-off apparatus.

17. A method as claimed in claim 1, comprising facilitating the removing of the rubber particles from the drying surface by moistening.

18. A method as claimed in claim 1, comprising facilitating the removing of the rubber particles from the drying surface, and the obtaining of them in discrete form, by dusting.

ADAM JOAN ADRIAAN
YSSEL DE SCHEPPER.